US008257668B2

(12) United States Patent
Mukai et al.

(10) Patent No.: US 8,257,668 B2
(45) Date of Patent: Sep. 4, 2012

(54) HYDROGEN GENERATOR AND FUEL CELL SYSTEM

(75) Inventors: Yuji Mukai, Osaka (JP); Akira Maenishi, Osaka (JP); Kunihiro Ukai, Nara (JP); Toru Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 441 days.

(21) Appl. No.: 12/307,466

(22) PCT Filed: Sep. 3, 2007

(86) PCT No.: PCT/JP2007/067118

§ 371 (c)(1), (2), (4) Date: May 19, 2009

(87) PCT Pub. No.: WO2008/029755

PCT Pub. Date: Mar. 13, 2008

(65) Prior Publication Data

US 2010/0015480 A1 Jan. 21, 2010

(30) Foreign Application Priority Data

Sep. 5, 2006 (JP) ................................ 2006-240645

(51) Int. Cl.
*B01J 8/00* (2006.01)

(52) U.S. Cl. ........ 422/629; 422/187; 422/600; 422/625; 422/626; 422/627; 422/630; 422/631; 422/641; 422/646; 422/647; 422/651; 429/19; 429/20; 48/61; 48/127.9; 423/648.1; 423/650; 423/651; 423/652; 423/655

(58) Field of Classification Search .......... 422/627–630, 422/644, 647; 60/780
See application file for complete search history.

(56) References Cited

U.S. PATENT DOCUMENTS 7,182,921 B2 * 2/2007 Miura et al. ................. 422/187
(Continued)

FOREIGN PATENT DOCUMENTS

EP 1 408 004 A2 4/2004
(Continued)

OTHER PUBLICATIONS

Extended European Search Report issued in European Patent Application No. EP 07806591.9 dated Jun. 8, 2011.

*Primary Examiner* — Kaity V. Handal
(74) *Attorney, Agent, or Firm* — McDermott Will & Emery LLP

(57) ABSTRACT

A hydrogen generator according to the invention comprises: a combustion gas passage (5) configured to flow combustion gas coming from a combustor; a preheat-evaporator (6) which is supplied with a material gas and water and configured to evaporate the water and heat the material gas by heat transmitted from the combustion gas passage and a carbon monoxide reducer (10) through partition a wall; a reformer (7) configured to generate reformed gas from the material gas and steam fed from the preheat-evaporator by using a reforming catalyst (8) and heat transmitted from the combustion gas passage through the partition wall; the carbon monoxide reducer (10) configured to remove carbon monoxide from the reformed gas fed from the reformer by a carbon monoxide removing catalyst (9); a cylindrical body (3) closed at both ends thereof having an internal space is divided by the partition walls (1), (2), (30), (47) to form the combustion gas passage, preheat-evaporator, reformer and carbon monoxide reducer within the cylindrical body (3), wherein a heat transmission buffering section (11) is formed between the preheat-evaporator and the carbon monoxide reducer such that the partition wall (30) that defines the preheat-evaporator and the partition wall (47) that defines the carbon monoxide reducer are opposed to each other with a space therebetween.

17 Claims, 11 Drawing Sheets

U.S. PATENT DOCUMENTS

| | | | | |
|---|---|---|---|---|
| RE39,675 | E * | 6/2007 | Kudo et al. | 422/198 |
| 2002/0042035 | A1 | 4/2002 | Komiya et al. | |
| 2004/0068933 | A1 | 4/2004 | Nakamura et al. | |
| 2005/0026011 | A1 * | 2/2005 | Suzuki et al. | 429/19 |
| 2006/0207179 | A1 * | 9/2006 | Mizusawa et al. | 48/197 R |
| 2007/0151152 | A1 * | 7/2007 | Mukai et al. | 48/127.9 |

FOREIGN PATENT DOCUMENTS

| | | |
|---|---|---|
| JP | 8-225301 | 9/1996 |
| JP | 2002-187705 | 7/2002 |
| JP | 2003-321206 | 11/2003 |
| JP | 2005-193135 | 7/2005 |

* cited by examiner (a)

(b)

HYDROGEN GENERATOR AND FUEL CELL SYSTEM

RELATED APPLICATIONS

This application is the U.S. National Phase under 35 U.S.C. §371 of International Application No. PCT/JP2007/067118, filed on Sep. 3, 2007, which in turn claims the benefit of Japanese Application No. 2006-240645, filed on Sep. 5, 2006, the disclosures of which Applications are incorporated by reference herein.

TECHNICAL FIELD

The present invention relates to a hydrogen generator for producing hydrogen-rich reformed gas, using hydrocarbon-based fuel such as city gas or LPG as a material gas. The present invention also relates to a fuel cell system equipped with a fuel cell for generating electric power from hydrogen produced by the hydrogen generator.

BACKGROUND ART

Fuel cell systems have, as chief components, a hydrogen generator for producing hydrogen-rich reformed gas and a fuel cell for generating electric power by utilizing hydrogen generated by the hydrogen generator.

The hydrogen generator includes a reformer and a carbon monoxide remover. The reformer uses hydrocarbon-based fuel such as city gas and LPG as a material gas and generates reformed gas containing hydrogen, methane, carbon monoxide (about 10%), carbon dioxide and steam, through a steam reforming reaction of the material gas and the water. The carbon monoxide remover removes carbon monoxide from the reformed gas, which carbon monoxide poisons the fuel cell. In cases where a polymer electrolyte fuel cell is used as the fuel cell, it is necessary to reduce the carbon monoxide concentration of the reformed gas to about 10 ppm. To this end, the carbon monoxide reducer is typically formed as a two-stage remover composed of: a shift converter for removing carbon monoxide up to about 0.5% through a CO shift reaction using a shifting catalyst; and a selective oxidizer for further removing carbon monoxide through a selective oxidization reaction using a selective oxidizing catalyst to reduce the CO concentration to about 10 ppm or less.

There have heretofore been proposed various hydrogen generators that are designed in view of miniaturization, high efficiency and improved start-up performance. In a known small-sized, high-efficiency hydrogen generator, heat exchange is performed between water and heat generated in the CO shift converter and the selective oxidation reactor which perform an exothermic reaction, in order to achieve improved heat recovery efficiency.

FIG. 7 shows one example of the hydrogen generators disclosed in Patent Document 1, which is composed of a plurality of concentric circular cylinders and includes a burner 20 located at the center thereof. A reformer 8 filled with a reforming catalyst is disposed on inner side of the plurality of circular cylinders whereas a carbon monoxide reducer (shift converter in Patent Document 1) 10 filled with a carbon monoxide removing catalyst (CO shifting catalyst in Patent Document 1) is disposed on outer side of the plurality of circular cylinders. A material gas is fed from a material gas supply port 21 to the reformer 8 through a passage 22. Water is fed from a water supply port 23 and is sent to the reformer 8 through passages 24*a*, 24*b* and then the passage 22. Herein, the passage 22 is in contact with the outer periphery of the carbon monoxide reducer 10. The material gas and water sent to the passage 22 are heated by the reaction heat of the carbon monoxide reducer 10 and then introduced into the shift convertor 8 as a mixture gas of the material gas and steam. The reformer 8 is heated by the burner 20, so that a steam reforming reaction occurs between the material gas and the steam by the action of the reforming catalyst, generating hydrogen-rich reformed gas. The reformed gas generated in the reformer 8 is sent to the carbon monoxide reducer 10 by way of a passage 25 and carbon monoxide is removed from the reformed gas through a CO shift reaction by the action of the CO shifting catalyst. The reformed gas from which carbon monoxide has been removed is taken out of an outlet port 26.

In the carbon monoxide reducer 10 serving as a shift converter, a temperature gradient, which provides an inlet temperature of about 280° C. and an outlet temperature of about 200° C., is suited for the CO shift reaction. To this end, the hydrogen generator shown in FIG. 7 has a heat insulating material 27 disposed at the inner periphery of the carbon monoxide reducer 10 and the heat insulating material 27 is varied in thickness so as to be thinner at the inlet side of the carbon monoxide reducer 10 than at the outlet side, so that the heat generated by the burner 20 is more easily transmitted at the inlet side of the carbon monoxide reducer 10 than at the outlet side. As a result, the inlet temperature and outlet temperature of the carbon monoxide reducer 10 are set to the above-noted temperatures to thereby set a proper temperature gradient in the flowing direction of the reformed gas.

Patent Document 1: Japanese Laid-Open Patent Application Publication 2003-321206

DISCLOSURE OF THE INVENTION

Problem that the Invention Intends to Solve

However, in the hydrogen generator shown in FIG. 7, as described earlier, the outer periphery of the carbon monoxide reducer 10 is provided with the passage 22 for recovering the heat of the exothermic reaction that takes place in the carbon monoxide reducer 10 and the water passing through the passage 22 is evaporated by heating. Therefore, the outer periphery of the carbon monoxide reducer 10 is cooled by the water during the heat exchange, which may cause a temperature distribution that significantly varies in its thickness direction (radial direction) with low temperatures at the outer periphery of the carbon monoxide reducer 10 and high temperatures at the inner periphery.

In such a temperature distribution of the carbon monoxide reducer 10 that significantly varies in the direction perpendicular to the flow of the reformed gas, the temperature of the outlet of carbon monoxide reducer 10 in the thickness direction may become lower than 200° C., although a desirable outlet temperature for a shift converter is about 200° C. in view of reaction speed and reaction equilibrium. In the region having temperatures lower than 200° C., the catalyst does not function to contribute to the reaction for carbon monoxide removal. Therefore, there is a possibility that the carbon monoxide removal by the carbon monoxide reducer 10 becomes insufficient.

The invention is made under the circumstances and an object of the invention is to provide a hydrogen generator in which a temperature distribution occurs that varies less significantly in the thickness direction of the cylindrical carbon monoxide reducer so that carbon monoxide can be stably removed from the reformed gas, and a fuel cell system that uses the hydrogen generator.

Means of Solving the Problems

The above problem can be solved by the invention that provides a hydrogen generator comprising:

a combustion gas passage configured to flow combustion gas which has been generated in a combustor;

a preheat-evaporator which is supplied with a material gas and water and configured to evaporate the water and heat the material gas by heat transmitted from the combustion gas passage and a carbon monoxide reducer through a partition wall;

a reformer which has a reforming catalyst and is configured to generate a hydrogen-containing reformed gas through a steam reforming reaction between the material gas and steam fed from the preheat-evaporator, by using the reforming catalyst and the heat transmitted from the combustion gas passage through the partition wall;

the carbon monoxide reducer which has a carbon monoxide removing catalyst and is configured to remove carbon monoxide from the reformed gas fed from the reformer by an action of the carbon monoxide removing catalyst; and a cylindrical body closed at both ends thereof having an internal space which is divided by the partition wall to form the combustion gas passage, the preheat-evaporator, the reformer and the carbon monoxide reducer within the cylindrical body;

wherein a heat transmission buffering section is provided between the preheat-evaporator and the carbon monoxide reducer, the heat transmission buffering section being formed by a space between the partition wall that defines the preheat-evaporator and the partition wall that defines the carbon monoxide reducer, the partition walls being opposed to each other.

According to this configuration, the carbon monoxide reducer transmits heat to the preheat-evaporator thereby recovering the heat generated by the exothermic reaction in the carbon monoxide reducer as the heat to be used for heating the material gas and water in the preheat-evaporator. With this heat transmission, the heat transmission buffering section provided between the carbon monoxide reducer and the preheat-evaporator mitigates cooling of the preheat-evaporator side of the carbon monoxide reducer. Accordingly, the difference in temperature between the preheat-evaporator side of the carbon monoxide reducer and its opposite side can be restrained so that the temperature distribution in the thickness direction of the carbon monoxide reducer can be reduced.

The space (hereinafter referred to as "heat transmission space") between the partition walls opposed to each other in the heat transmission buffering section may be closed except an area communicated with a passage for the reformed gas flowing from the reformer to the carbon monoxide reducer or a passage for the reformed gas flowing out of the carbon monoxide reducer.

According to this configuration, the heat transmission buffering space is formed as a space into which the reformed gas can flow, which enables heat transmission from the reformed gas that is flowing into the heat transmission buffering space to the carbon monoxide reducer. Moreover, the preheat-evaporator side of the carbon monoxide reducer can be heated by the reformed gas flowing into the heat transmission buffering space when starting up the hydrogen generator, so that the time required for raising the temperature of the carbon monoxide reducer to a specified temperature at the start-up of the hydrogen generator and, in consequence, the time required for the start-up of the hydrogen generator can be reduced.

The space between the partition walls opposed to each other in the heat transmission buffering section may be filled with a heat transmission member.

According to this configuration, the degree of cooling of the preheat-evaporator side of the carbon monoxide reducer can be increased by the heat transmission effect of the heat transmission member. In addition, since the reformed gas does not flow into the space between the opposed partition walls in the heat transmission buffering section, effective purge can be carried out.

The heat transmission buffering section may be formed such that an amount of heat transmitted from the carbon monoxide reducer to the preheat-evaporator is larger at an upstream side of the carbon monoxide reducer than at a downstream side in a flow of the reformed gas.

According to this configuration, a sufficient amount of reaction heat can be recovered by the water of the preheat-evaporator at the upstream side of the carbon monoxide reducer, whereas at the downstream side of the carbon monoxide reducer, excessive cooling to a temperature lower than a specified temperature can be prevented, while reducing the temperature distribution in the thickness direction.

The space between the partition walls opposed to each other in the heat transmission buffering section may be narrower at the upstream side of the carbon monoxide reducer than at the downstream side in the flow of the reformed gas.

A heat insulating layer may be disposed so as to enclose the cylindrical body.

According to this configuration, the temperature distribution in the thickness direction of the carbon monoxide reducer can be further reduced by the heat insulating function of the heat insulating layer.

The heat transmission buffering space may be in communication with a passage for the reformed gas flowing out of the carbon monoxide reducer. A portion of the carbon monoxide reducer defining partition wall which portion faces the preheat-evaporator defining partition wall may be made of metal, and an extension portion thereof may be joined to the preheat-evaporator defining partition wall at the upstream side of the carbon monoxide reducer in the flow of the reformed gas.

In this configuration, since the upstream portion of the carbon monoxide reducer having a higher heat release value is more cooled by the preheat-evaporator whereas cooling of the downstream portion of the carbon monoxide reducer having a lower heat release value by the preheat-evaporator is restricted by the heat transmission buffering section 11, the temperature distribution in the thickness direction of the carbon monoxide reducer can be further reduced.

A joint portion between the extension portion and the preheat-evaporator defining partition wall may be located at a position between an upstream end and a downstream end of the carbon monoxide reducer in a flowing direction of the gas in the carbon monoxide reducer and this position may be set based on the filling quantity of the carbon monoxide removing catalyst.

According to this configuration, the cooling of the upstream portion of the carbon monoxide reducer and the reduction of the temperature distribution in the thickness direction of the downstream portion can be effectively carried out in accordance with the filling quantity and type of the carbon monoxide removing catalyst.

A joint portion between the extension portion and the preheat-evaporator defining partition wall may be located at a position between an upstream end of the carbon monoxide reducer in the carbon monoxide reducer and a position apart from the upstream end by about one fourth of a length of the carbon monoxide reducer in a flowing direction if a gas in the carbon monoxide reducer.

According to this configuration, the cooling of the upstream portion of the carbon monoxide reducer and the reduction of the temperature distribution in the thickness direction of the downstream portion can be effectively carried out.

A heat transmission buffering section partition wall may be formed in the heat transmission buffering space such that the reformed gas flowing out of the carbon monoxide reducer flows in a direction opposite to a flowing direction of the reformed gas in the carbon monoxide reducer along the carbon monoxide reducer defining partition wall and then flow in the same direction as the flowing direction of the reformed gas in the carbon monoxide reducer along the preheat-evaporator defining partition wall.

According to this configuration, the reformed gas from the carbon monoxide reducer flows in the heat transmission buffering space along the preheat-evaporator defining partition wall, so that heat can be recovered from the reformed gas by the water flowing in the preheat-evaporator while reducing the temperature distribution in the thickness direction of the carbon monoxide removing catalyst. This leads to effective heat utilization.

The reformed gas flowing in the heat transmission buffering space may change its flowing direction from the opposite direction to the same direction relative to the flowing direction of the reformed gas in the carbon monoxide reducer at a position which is located between the upstream end and downstream end of the carbon monoxide reducer in the flowing direction of the gas in the carbon monoxide reducer, the position being set based on the filling quantity of the carbon monoxide removing catalyst.

According to this configuration, the cooling of the upstream portion of the carbon monoxide reducer; the reduction of the temperature distribution in the downstream position in its thickness direction; and heat utilization can be effectively carried out in accordance with the filling quantity and type of the carbon monoxide removing catalyst.

The reformed gas flowing in the heat transmission buffering space may change its flowing direction from the opposite direction to the same direction relative to the flowing direction of the reformed gas in the carbon monoxide reducer at a position which is located between the upstream end of the carbon monoxide reducer with respect to the flowing direction of the gas in the carbon monoxide reducer and a position that is apart from the upstream end by substantially one fourth of the length of the carbon monoxide reducer.

According to this configuration, the cooling of the upstream portion of the carbon monoxide reducer; the reduction of the temperature distribution of the downstream portion in its thickness direction; and heat utilization can be effectively carried out.

The passage in the heat transmission buffering space, in which the reformed gas flows along the preheat-evaporator defining partition wall, may be provided with a heat transmission member.

According to this configuration, heat can be more effectively recovered from the reformed gas that is flowing out of the carbon monoxide reducer, which leads to more effective heat utilization.

The heat transmission member may be composed of particles containing alumina or metal as a chief component.

According to this configuration, the heat exchange with the reformed gas from the carbon monoxide reducer can be more effectively performed.

The preheat-evaporator defining partition wall along which the reformed gas flows in the heat transmission buffering space, may be provided with a fin-shaped projection.

According to this configuration, the heat exchange with the reformed gas flowing from the carbon monoxide reducer can be more effectively performed.

An air feeding path may be formed for feeding air to a passage for the reformed gas that flows into the carbon monoxide reducer, and the carbon monoxide removing catalyst may be a selective oxidation catalyst.

According to this configuration, a temperature rise in the upstream portion of the selective oxidation catalyst can be restrained and the temperature distribution of the downstream portion of the selective oxidation catalyst in its thickness direction can be reduced, so that the recovery of heat from the outflowing reformed gas can be more effectively performed.

The invention also provides a fuel cell system comprising the hydrogen generator described in any one of claims 1 to 15 and a fuel cell for generating electric power by use of the reformed gas fed from the hydrogen generator and hydrogen-containing oxidizing gas.

According to this configuration, since carbon monoxide has been stably removed from the reformed gas fed from the hydrogen generator as described earlier, power generation can be performed in the fuel cell without causing deterioration of the fuel cell due to poisoning.

These objects as well as other objects, features and advantages of the invention will become apparent to those skilled in the art from the following detailed description of preferred embodiments with reference to the accompanying drawings.

Effects of the Invention

According to the invention, the heat transmission buffering section provided between the carbon monoxide reducer and the preheat-evaporator mitigates cooling of the preheat-evaporator side of the carbon monoxide reducer to prevent an increase in the temperature difference between the preheat-evaporator side of the carbon monoxide reducer and its opposite side, so that variations in the temperature distribution in the thickness direction of the carbon monoxide reducer can be reduced and, in consequence, carbon monoxide contained in the reformed gas can be stably reduced.

REFERENCE NUMERALS IN THE DRAWINGS

Figure 1:
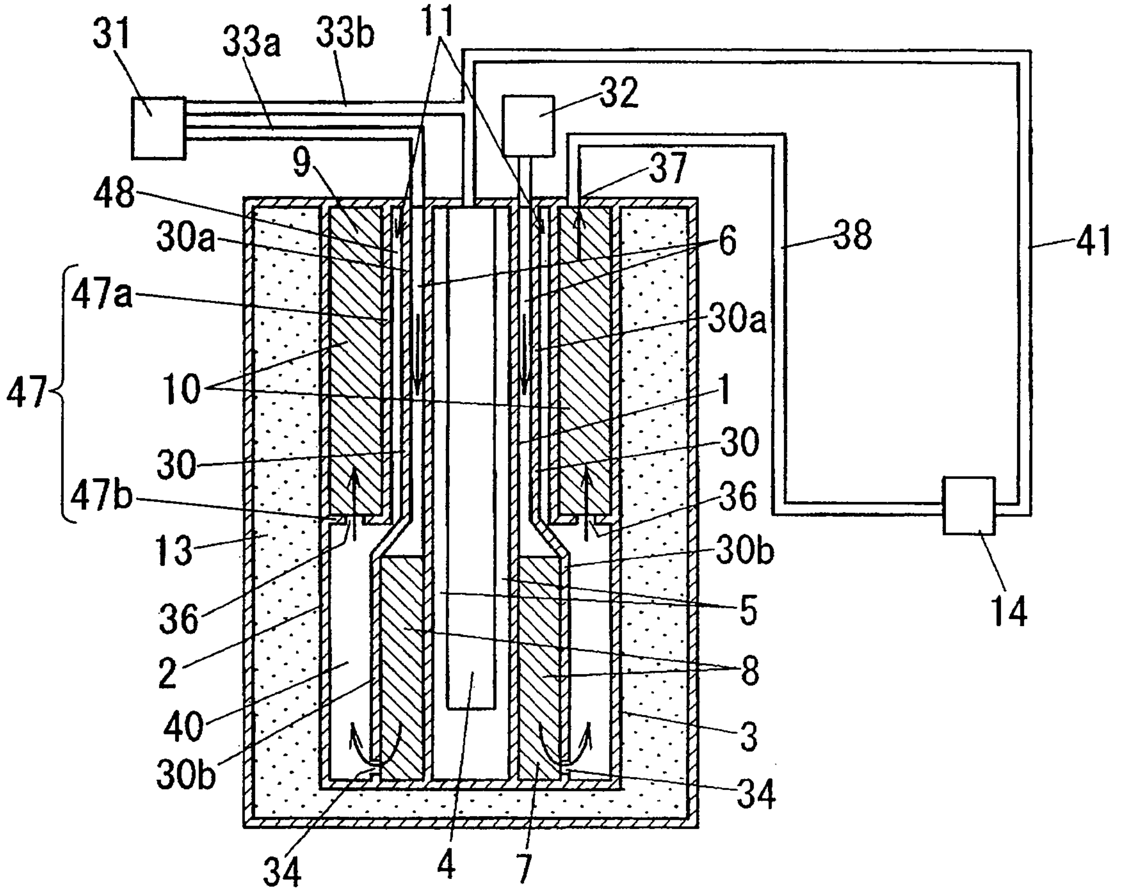
FIG. 1 is a sectional view that schematically shows a configuration of a hydrogen generator and a fuel cell system according to a first embodiment of the invention.

1: inner cylinder
2: outer cylinder
3: cylindrical body
4: combustor
5: combustion gas passage
6: preheat-evaporator
7: reforming catalyst
8: reformer
9: carbon monoxide removing catalyst
10: carbon monoxide reducer
11: heat transmission buffering section
12: heat transmission member
13: heat insulating layer
14: fuel cell
30: partition cylinder
30*a*: small diameter portion
30*b*: large diameter portion
31: material gas feeding section
32: water feeder
33*a*, 33*b*: material gas feeding pipe
34: outlet
36: inlet
37: outlet
38: reformed gas feeding pipe
40: reformed gas passage
41: reformed gas return pipe
43: communication port
44: cover plate
46: projecting portion
47: separating wall
47*a*: vertical wall
47*b*: horizontal wall
48: heat transmission buffering space
49: reformed gas passage
50: joint
51: heat transmission buffering section partition wall
52: heat transmission fin
53: air feeding section
54: selective oxidation catalyst
55: air feeding path
57: high heat transmission member

BEST MODE FOR CARRYING OUT THE INVENTION

Referring now to the accompanying drawings, the best mode for carrying out the invention will be described below. In all these figures, the same or corresponding components are indicated by the same numerals and redundant descriptions thereof are omitted.

First Embodiment

FIG. 1 is a sectional view that schematically shows a configuration of a hydrogen generator and a fuel cell system according to a first embodiment of the invention. As illustrated in FIG. 1, the system of this embodiment has a cylindrical body 3 that serves as a casing thereof. The cylindrical body 3 has a concentric double circular-cylindrical structure composed of an inner cylinder (partition wall) 1 and an outer cylinder (partition wall) 2 with their axes extending in a vertical direction. The upper and lower ends of the cylindrical body 3 are closed. A combustor 4 constituted by a burner is provided at the center of the inside of the inner cylinder 1, and a combustion gas passage 5 is formed between the combustor 4 and the inner cylinder 1 so as to extend along the inner periphery of the inner cylinder 1. The combustion gas passage 5 is in communication with the outside (the atmosphere) through an outlet (not shown).

A tubular partition cylinder (partition wall) 30 is disposed between the inner cylinder 1 and the outer cylinder 2 so as to concentrically enclose the outer periphery of the inner cylinder 1. The upper and lower portions of the partition cylinder 30 are a small diameter portion 30*a* having a small diameter and a large diameter portion 30*b* having a large diameter, respectively. The cylindrical space formed between the small diameter portion 30*a* of the partition cylinder 30 and the inner cylinder 1 constitutes a preheat-evaporator 6. Connected to the upper end of the preheat-evaporator 6 are a material gas feeding section 31 and a water feeder 32. The material gas feeding section 31 is connected to the preheat-evaporator 6 through a material gas feeding pipe 33*a* and also connected to the combustor 4 through a material gas feeding pipe 33*b*.

A cylindrical space formed between the large diameter portion 30*b* of the partition cylinder 30 and the inner cylinder 1 and a reforming catalyst 7 that fills up this space constitute a reformer 8. An outlet 34 is provided to open in the large diameter portion 30*b* of the partition cylinder 30 that defines the outer periphery of the lower end portion of the reformer 8.

A cylindrical carbon monoxide reducer 10 is disposed at the inner periphery of the upper portion of the outer cylinder 2 so as to enclose the preheat-evaporator 6. Specifically, a separating wall (partition wall) 47 is formed within the cylindrical body 3, which is composed of a cylindrical vertical wall 47*a* extending from the upper wall of the cylinder body 3 downwardly along the upper portion of the outer cylinder 2 and an annular horizontal wall 47*b* extending horizontally from the lower end of the vertical wall 47*a* to the outer cylinder 2. The space defined by the separating wall 47, the upper wall of the cylinder body 3 and the upper portion of the outer cylinder 2 and a carbon monoxide removing catalyst 9 filling this space constitute the carbon monoxide reducer 10. The horizontal wall 47*b* of the separating wall 47 that defines the lower end of the carbon monoxide reducer 10 is provided with an open inlet 36, whereas the upper wall of the cylindrical body 3 that defines the upper end is provided with an outlet 37. This outlet 37 is connected to a fuel cell 14 through a reformed gas feeding pipe 38. Although the carbon monoxide reducer 10 described herein serves as a shift converter for removing carbon monoxide through a CO shift reaction using a CO shifting catalyst as the carbon monoxide removing catalyst 9, there may be provided a selective oxidization device at the stage subsequent to the shift converter, which device removes carbon monoxide through a CO selective oxidization using a CO selective oxidation catalyst as the carbon monoxide removing catalyst 9.

The vertical wall 47*a* of the separating wall 47 that defines the carbon monoxide reducer section 10 is opposed to the small diameter portion 30*a* of the partition cylinder 30 that defines the preheat-evaporator 6, with a certain small spacing therebetween. The small diameter portion 30*a* of the partition cylinder 30, the vertical wall 47*a* of the separating wall 47 and the space (hereinafter referred to as "heat transmission buffering space") 48 between them constitute a heat transmission buffering section 11 between the preheat-evaporator 6 and the carbon monoxide reducer 10. In the embodiment shown in FIG. 1, the heat transmission buffering space 48 is communicated, at its lower end thereof, with a cylindrical reformed gas passage 40 that is a space between the reformer 8 and the outer cylinder 2.

The outer periphery and under surface of the outer cylinder 2 of the cylindrical body 3 are covered with a heat insulating layer 13. The inner cylinder 1, the outer cylinder 2, the cylindrical body 3, the partition cylinder 30 and the separating wall 47 are made of materials having heat resistance and strength such as metal or ceramics. In this embodiment, these members are made of metal (e.g., stainless steel).

In the hydrogen generator of the above-described configuration, the combustor 4 is configured to generate combustion gas by combusting hydrocarbon-based fuel such as city gas or LPG that is supplied from the material gas feeding section 31 through the material gas feeding pipe 33*b*. This combustion gas is discharged through the combustion gas passage 5 after flowing along the inner periphery of the inner cylinder 1.

Water fed from the water feeder 32 and the hydrocarbon-based material gas such as city gas or LPG fed from the material gas feeding section 31 through the material gas feeding pipe 33*a* firstly enter the preheat-evaporator 6. The preheat-evaporator 6 is heated by the combustion gas through the inner cylinder 1 which combustion gas is flowing in the combustion gas passage 5. The reaction heat generated by the CO shift reaction or the CO selective oxidation reaction in the carbon monoxide reducer 10 is transmitted to the preheat-evaporator 6 through the heat transmission buffering section 11, so that the preheat-evaporator 6 is also heated by the heat transmitted from the carbon monoxide reducer 10. Accordingly, the material gas and water are heated when passing through the preheat-evaporator 6, so that a mixed gas containing the material gas and steam exuded from the water is produced. This mixed gas flows into the reformer 8 and the material gas and steam cause a steam reforming reaction with the catalytic action of the reforming catalyst 7, so that hydrogen-rich reformed gas is generated. Since the steam reforming reaction is an endothermic reaction, the reformer 8 is maintained at temperatures within the range of 600 to 700° C. that are reforming reaction temperatures, by heating the reformer 8 with the combustion gas flowing in the combustion gas passage 5.

The reformed gas generated in the reformer 8 flows from the outlet 34 at the lower end of the reformer 8 into the reformed gas passage 40 and exchanges heat with the reformer 8 when moving upward in the reformed gas passage 40 so that its temperature drops to about 280° C.

Then, the reformed gas flows into the carbon monoxide reducer 10 from the inlet 36 provided at the lower end thereof so that carbon monoxide contained in the reformed gas is removed as carbon dioxide by the catalytic action of the carbon monoxide removing catalyst 9. In cases where the carbon monoxide reducer 10 is composed of a shift converter that removes carbon monoxide through a CO shift reaction, it is desirable in view of reaction speed and reaction equilibrium that the carbon monoxide reducer 10 have a temperature gradient that varies in the flowing direction of the reformed gas with a temperature of about 280° C. at the inlet 36 and a temperature of about 200° C. at the outlet 37. The carbon monoxide reducer 10 is opposed to the preheat-evaporator 6 in parallel with the flowing direction of the reformed gas and exchanges heat with the water flowing in the preheat-evaporator 6. The portion of the carbon monoxide reducer 10 closer to the outlet 37 is closer to the upstream of the flow of water in the preheat-evaporator 6 and therefore a larger amount of heat is exchanged thereat. Accordingly, the CO shift reaction heat of the reformed gas, which has a temperature of about 280° C. and is flowing from the inlet 36 to the carbon monoxide reducer 10, is cooled by the heat exchange with the preheat-evaporator 6 so that the temperature of the reformed gas drops to about 200° C. at the outlet 37. Thus, the temperature gradient of the carbon monoxide reducer 10 is set to vary in the flowing direction of the reformed gas such that the temperature of the upstream side is higher than that of the downstream side. The same holds true for the case where the carbon monoxide reducer 10 has a selective oxidization device that is provided at the stage subsequent to the reformer, for removing carbon monoxide by a CO selective oxidation reaction. In this case, the exothermic heat of the CO selective oxidation reaction is suppressed by the heat exchange between the reformed gas flowing in the selective oxidation device and water flowing in the preheat-evaporator 6 to thereby make the temperature of the selective oxidation device be a desirable value, i.e., about 150° C.

Provided between the carbon monoxide reducer 10 and the preheat-evaporator 6 is the heat transmission buffering section 11 that is constituted by the two partition walls, i.e., the small diameter portion 30*a* of the partition cylinder 30 and the vertical wall 47*a* of the separating wall 47 and by the space 48 between these two partition walls. Unlike the conventional example, the carbon monoxide reducer 10 and the preheat-evaporator 6 in this embodiment do not contact each other with only one partition wall therebetween. By virtue of this, the preheat-evaporator 6 side of the carbon monoxide reducer 10 can be prevented from excessively dropping in temperature by excessive cooling by the heat exchange with the water; the difference in temperature between the preheat-evaporator 6 side of the carbon monoxide reducer 10 and its opposite side can be prevented from becoming significant; and the temperature distribution of the carbon monoxide reducer 10 in its thickness direction (i.e., a direction perpendicular to the flowing direction of the reformed gas, that is, a radial direction of the cylindrical body 3) do not become significant and can be reduced. Meanwhile, the preheat-evaporator 6 is heated by the combustion gas through the inner cylinder 1 which combustion gas is flowing in the combustion gas passage 5. Therefore, even though the amount of heat transmitted from the carbon monoxide reducer 10 is thus suppressed, a sufficient amount of heat necessary for evaporating the water can be ensured.

Accordingly, the temperature gradient of the carbon monoxide reducer 10 in the flowing direction of the reformed gas can be properly set as described earlier while reducing variations in the temperature distribution in the thickness direction of the carbon monoxide reducer 10, so that carbon monoxide can be stably removed from the reformed gas with high efficiency. For instance, in cases where the carbon monoxide reducer 10 is constituted by a shift converter and a selective oxidation device, the CO concentration (about 10%) of the reformed gas generated by the reformer 8 can be reduced to about 0.5% by the shift converter and to about 10 ppm by the selective oxidation device.

As described earlier, the hydrogen-rich reformed gas, from which carbon monoxide has been removed by the carbon monoxide reducer 10, is fed from the inlet 37 to the fuel cell 14 through the reformed gas feeding pipe 38, and electric power is generated using hydrogen contained in the reformed gas and oxygen-containing oxidizing gas such as air. A reformed gas return pipe 41 is connected between the fuel cell 14 and the material gas feeding pipe 33*b*, and the reformed gas which has not been consumed in the fuel cell 14 is fed from the reformed gas return pipe 41 to the combustor 4 through the material gas feeding pipe 33*b*.

In the hydrogen generator of the invention, since the reformed gas, from which carbon monoxide has been stably removed, can be sent out as described above, there is no chance that the catalyst of the fuel cell 14 deteriorates owing to poisoning by carbon monoxide and stable power generation can be performed over a long period of time in the fuel cell 14.

In the embodiment shown in FIG. 1, the heat transmission buffering space 48 is formed as a space inside the cylindrical body 3 such that the space 48 is communicated at the lower end thereof with the reformed gas passage 40. Therefore, the reformed gas generated in the reformer 8 can flow into the heat transmission buffering section 11 through the reformed gas passage 40. The reformed gas contains steam and if this steam is condensed into water, the condensed water will flow from the heat transmission buffering space 48 into the reformed gas passage 40, so that no condensed water stagnation occurs in the heat transmission buffering space 48. This eliminates the possibility that it becomes difficult to raise the temperature of the carbon monoxide reducer 10 because of the influence of condensed water staying in the heat transmission buffering space 48 when starting up the hydrogen generator and the start-up performance of the system deteriorates. As a result, stable start-up can be ensured.

In addition, the heat insulating layer 13 is provided so as to enclose the cylindrical body 3, thereby insulating the external side of the carbon monoxide reducer 10. Thereby, heat dissipation from the outer periphery of the carbon monoxide reducer 10 can be reduced and variations in the temperature distribution of the carbon monoxide reducer 10 in its thickness direction can be further reduced. In addition, since the amount of heat dissipated to the outside from the carbon monoxide reducer 10 can be reduced, the heat recovery efficiency of the preheat-evaporator 6 that recovers the reaction heat of the carbon monoxide reducer 10 can be increased.

[Simulation]

Figure 6:
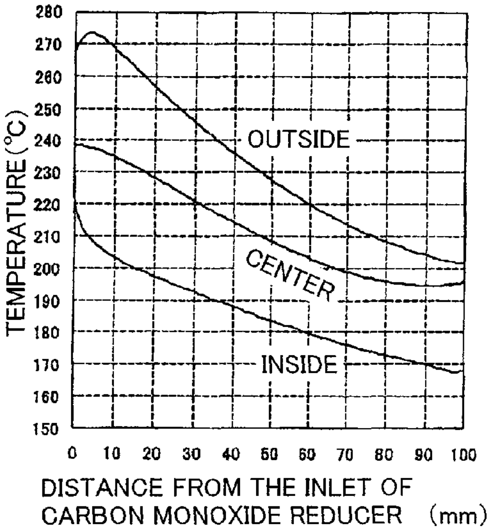
FIG. 6 is a graph showing the result of a simulation conducted to estimate a temperature distribution that varies in the thickness direction of a carbon monoxide reducer.
Figure 6:
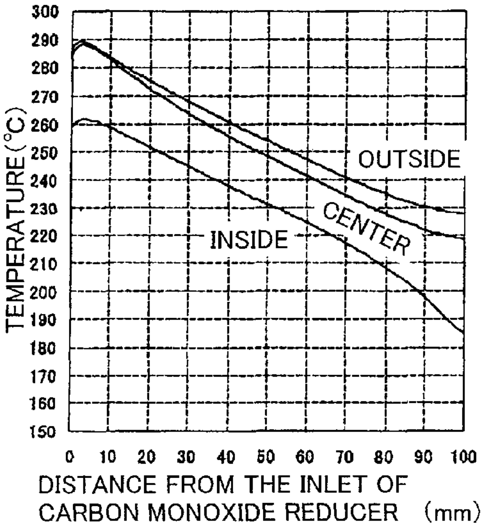
Figure 7:
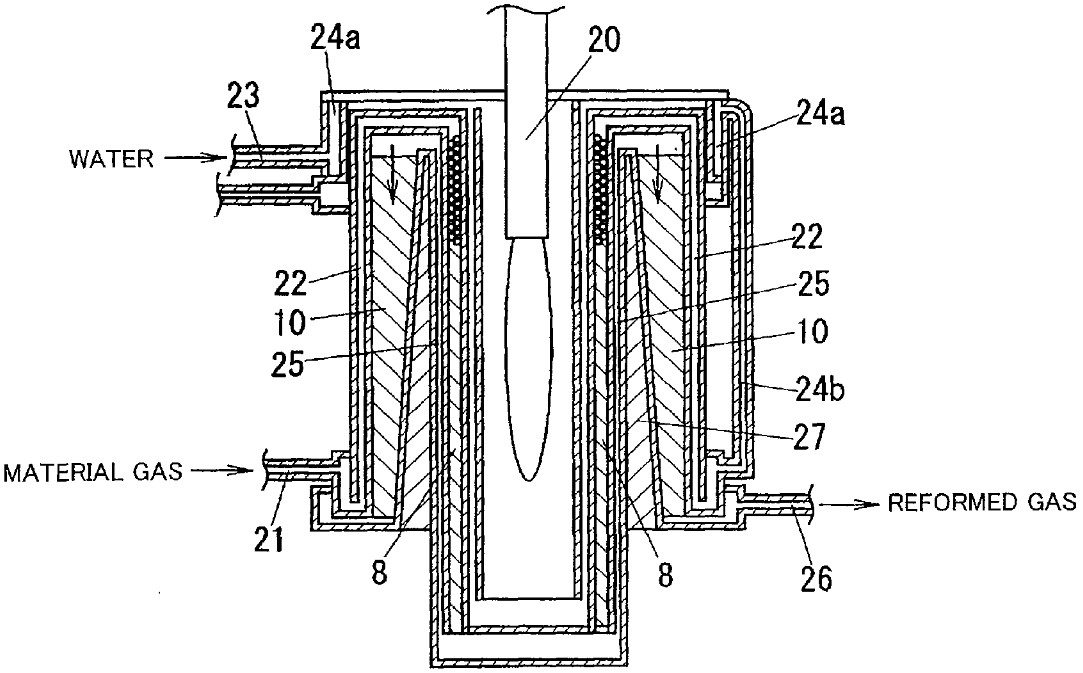
FIG. 7 is a schematic sectional view showing a conventional example.

FIG. 6(*a*) shows the result of a two-dimensional thermo-fluid reaction simulation conducted on a model (Comparative Example) prepared by modifying the hydrogen generator shown in FIG. 1 such that the preheat-evaporator 6 and the carbon monoxide reducer 10 are brought into direct contact with each other without interposing the heat transmission buffering section 11 therebetween. The simulation was made on assumption that the height of the carbon monoxide reducer 10 was set to 100 mm, the temperature of the gas flowing into the carbon monoxide reducer 10 was set to 250° C., and the internal side of the carbon monoxide reducer 10 was cooled by steam. Temperatures at the internal side, center and external side of the carbon monoxide reducer 10 in the thickness direction are shown in FIG. 6(*a*). As can be estimated from the simulation result shown in FIG. 6(*a*), the internal side of the carbon monoxide reducer 10 was excessively cooled and the temperature of the carbon monoxide reducer 10 significantly varies in its thickness direction, and the maximum temperature difference in the temperature distribution in the thickness direction was estimated to be about 65° C.

In contrast, FIG. 6(*b*) shows the result of a two-dimensional thermo-fluid reaction simulation conducted on a model that is the hydrogen generator shown in FIG. 1 having the heat transmission buffering section 11 between the preheat-evaporator 6 and the carbon monoxide reducer 10. This simulation was made on assumption that the height of the carbon monoxide reducer 10 was 100 mm, the height of the flow control section 11 was 100 mm, the temperature of the gas flowing into the carbon monoxide reducer 10 was 250° C., the flow rate of the inflow gas was equivalent to 1 kW power generation, and the internal side of the heat transmission buffering section 11 was cooled by steam. Temperatures at the internal side, center and external side of the carbon monoxide reducer 10 in the thickness direction are shown in FIG. 6(*b*). As can be estimated from the simulation result of FIG. 6(*b*), the heat exchange between the carbon monoxide reducer 10 and the steam was suppressed by providing the heat transmission buffering section 11 between the preheat-evaporator 6 and the carbon monoxide reducer 10, so that the temperature of the internal side of the carbon monoxide reducer 10 increased throughout the entire region in the gas flowing direction, the variation of the temperature distribution of the carbon monoxide reducer 10 in its thickness direction was insignificant and the maximum temperature difference in the temperature distribution in the thickness direction was improved to about 40° C.

Second Embodiment

Figure 2:
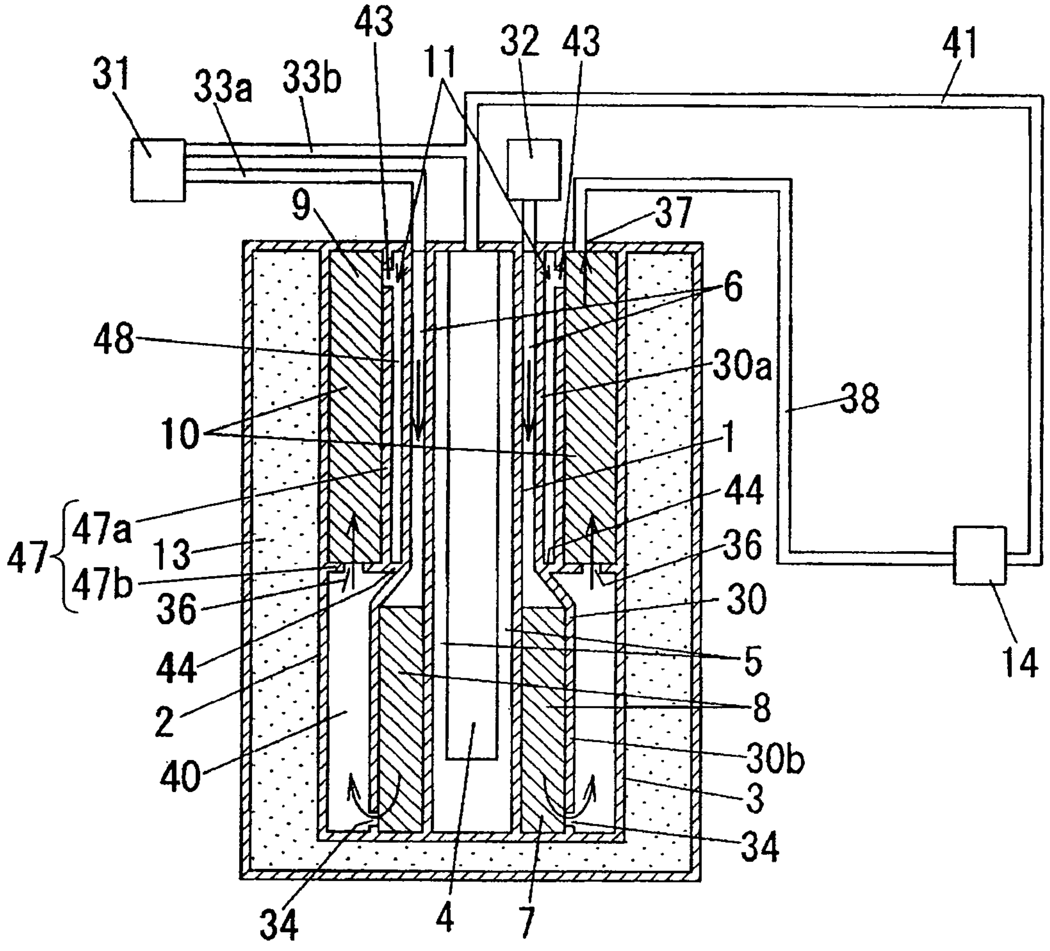
FIG. 2 is a sectional view that schematically shows a configuration of a hydrogen generator and a fuel cell system according to a second embodiment of the invention.

FIG. 2 is a sectional view that schematically shows a configuration of a hydrogen generator and a fuel cell system according to a second embodiment of the invention. As illustrated in FIG. 2, in the second embodiment, the heat transmission buffering space 48 is covered with the a cover plate 44 at the lower end thereof to inhibit communication with the reformed gas passage 40, and a communication port 43 is provided at the upper part of the vertical wall 47*a* of the separating wall 47 that defines the inner periphery of the carbon monoxide reducer 10 to allow communication between the heat transmission buffering space 48 and the carbon monoxide reducer 10. The other configuration is the same as that of FIG. 1.

In the second embodiment, since the heat transmission buffering space 48 and the carbon monoxide reducer 10 are communicated with each other through the communication port 43, the reformed gas of low CO concentration from which carbon monoxide has been removed by the carbon monoxide reducer 10 stagnates in the heat transmission buffering space 48. The reformed gas stagnating in the heat transmission buffering space 48 exchanges heat with the water in the preheat-evaporator 6, and therefore drops in temperature. In the case of the first embodiment shown in FIG. 1, if this reformed gas, whose temperature has dropped, flows into the carbon monoxide reducer 10, the reaction of the carbon monoxide reducer 10 will be adversely affected because the reformed gas, which has flown out of the reformer 8 and has high CO concentration, is stagnating in the heat transmission buffering space 48. In contrast with this, in the second embodiment shown in FIG. 2, the reformed gas stagnating in the heat transmission buffering space 48 is of low CO concentration and therefore the reformed gas, which has dropped in temperature, will not affect the reaction of the carbon monoxide reducer 10 even if it flows into the carbon monoxide reducer 10. Accordingly, the second embodiment enables more stable carbon monoxide removal, compared to the first embodiment shown in FIG. 1.

Third Embodiment

Figure 3:
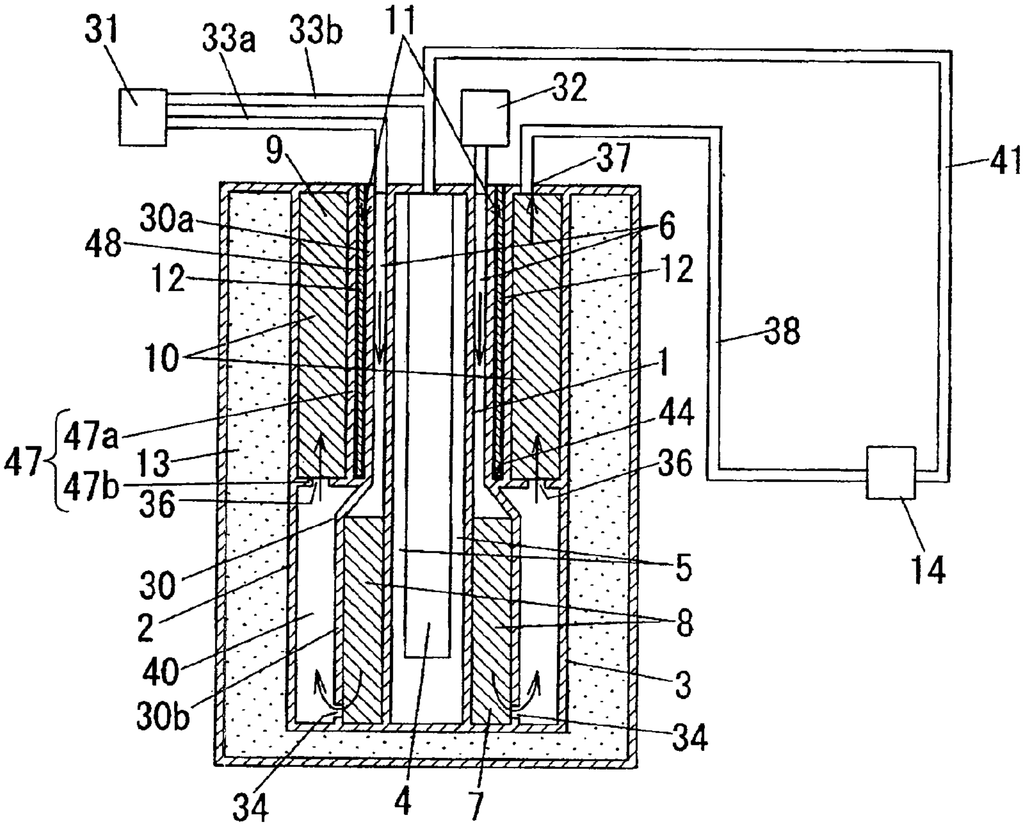
FIG. 3 is a sectional view that schematically shows a configuration of a hydrogen generator and a fuel cell system according to a third embodiment of the invention.

FIG. 3 is a sectional view that schematically shows a configuration of a hydrogen generator and a fuel cell system according to a third embodiment of the invention. As illustrated in FIG. 3, in the third embodiment, the heat transmission buffering space 48 is covered with the cover plate 44 at the lower end thereof to inhibit communication with the reformed gas passage 40, and the upper wall of the cylindrical body 3 that defines the upper end of the heat transmission buffering space 48 is opened to allow communication between the heat transmission buffering space 48 and the outside of the cylindrical body 3. Thus, the heat transmission buffering space 48 is isolated from the inside of the cylindrical body 3. The heat transmission buffering space 48 is filled with a heat transmission member 12. The heat transmission member 12 is made of, for example, a metal having a suitably selected heat conductivity. The other configuration is the same as that of FIG. 1.

Although the cylindrical heat transmission member 12 is detachably attached by inserting it into the heat transmission buffering space 48 in this embodiment, the invention is not necessarily limited to such a configuration. By filling the heat transmission buffering space 48 with the heat transmission member 12 in this way, cooling of the preheat-evaporator 6 side of the carbon monoxide reducer 10 can be accelerated owing to the heat transmission action of the heat transmission member 12. In addition, the inflow temperature and outflow temperature of the carbon monoxide reducer 10 are adjusted by selectively employing materials having different heat conductivities as the heat transmission member 12 or changing the arrangement of the heat transmission member 12, so that proper setting of the temperature gradient of the carbon monoxide reducer 10 in the flowing direction of the reformed gas can be facilitated. It should be noted that in the embodiments shown in FIGS. 1 and 2, the heat transmission member 12 may be arranged so as to fill the heat transmission buffering space 48.

In this embodiment, since the heat transmission buffering space 48 is filled with the heat transmission member 12, the reformed gas does not flow into the heat transmission buffering space 48, so that the reformed gas does not stagnate in the heat transmission buffering space 48. When purging is performed by replacing the gas present between the inner cylinder 1 and outer cylinder 2 of the cylindrical body 3 with purge gas prior to start-up of the hydrogen generator, the purging can be effectively carried out, because no reformed gas stagnates in the heat transmission buffering space 48. This enables it to reduce the amount of purge gas to be used thereby reducing the energy loss particularly in cases where city gas or LPG is used as the purge gas.

Fourth Embodiment

Figure 4:
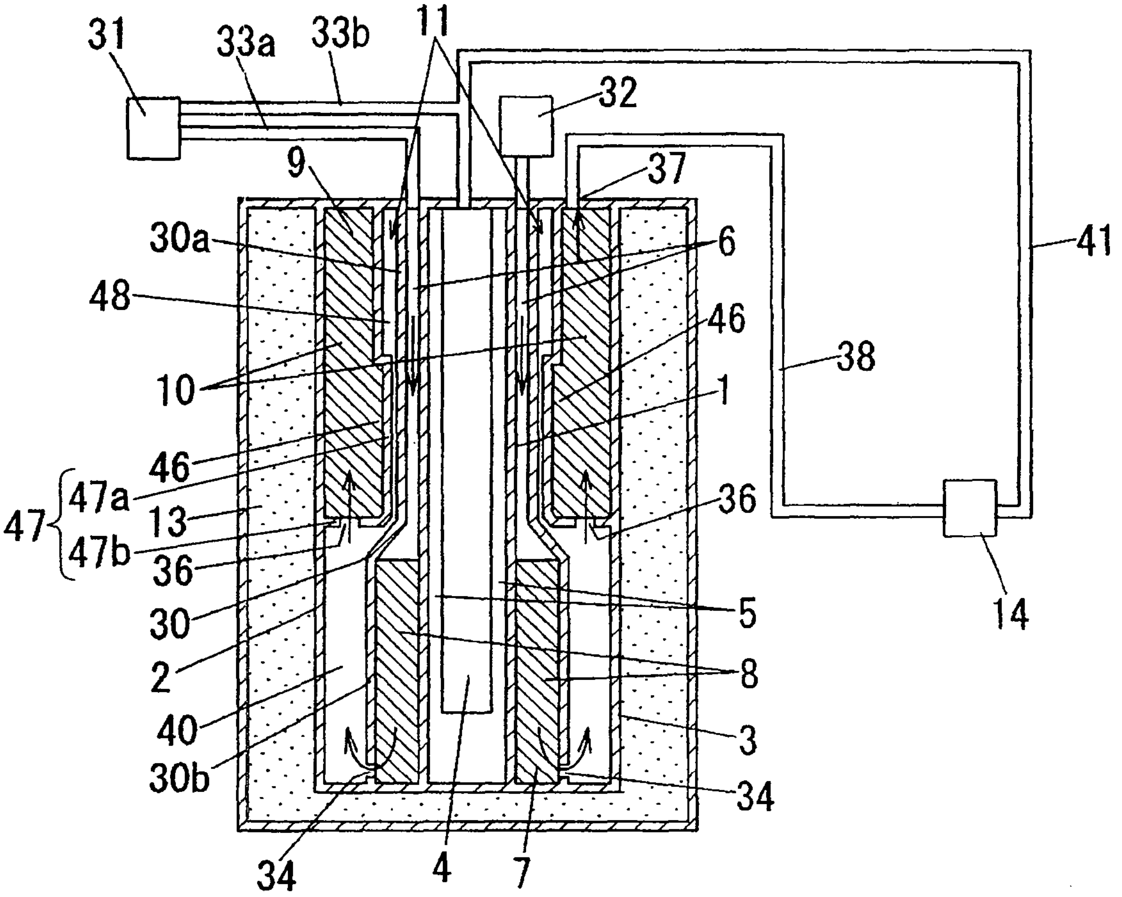
FIG. 4 is a sectional view that schematically shows a configuration of a hydrogen generator and a fuel cell system according to a fourth embodiment of the invention.

FIG. 4 is a sectional view that schematically shows a configuration of a hydrogen generator and a fuel cell system according to a fourth embodiment of the invention. As illustrated in FIG. 4, in the fourth embodiment, the lower part of the vertical wall 47*a* of the separating wall 47 projects inward, thereby forming a projecting portion 46 that extends over the entire inner periphery of the lower part of the carbon monoxide reducer 10, so the heat transmission buffering space 48 is small in width (thickness) in the lower part of the carbon monoxide reducer 10 and large in width in the upper part thereof. In other words, the spacing between the vertical wall 47*a* of the separating wall 47 and the small diameter portion 30*a* of the partition cylinder 30 in the heat transmission buffering section 11 is small in the lower part of the carbon monoxide reducer 10 and large in the upper part thereof. The other configuration is the same as that of FIG. 1.

In this embodiment, the amount of heat exchanged between the carbon monoxide reducer 10 and the preheat-evaporator 6 is great at the upstream side of the carbon monoxide reducer 10 in the flow of the reformed gas and small at the downstream side thereof. A sufficient amount of reaction heat is recovered by the water of the preheat-evaporator 6 at the upstream side of the carbon monoxide reducer 10, and excessive cooling to a specified temperature or lower is avoided while reducing variations in the temperature distribution in the thickness direction at the downstream side of the carbon monoxide reducer 10.

Fifth Embodiment

Figure 5:
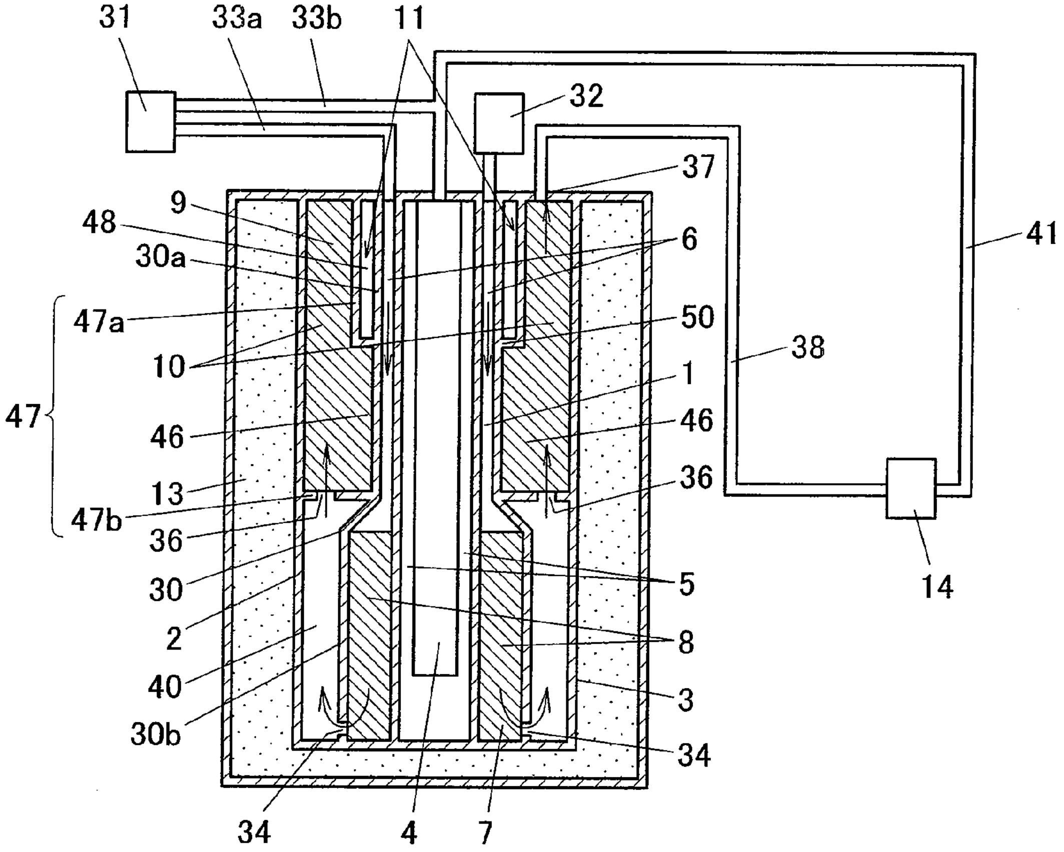
FIG. 5 is a sectional view that schematically shows a configuration of a hydrogen generator and a fuel cell system according to a fifth embodiment of the invention.

FIG. 5 is a sectional view that schematically shows a configuration of a hydrogen generator and a fuel cell system according to a fifth embodiment of the invention. As illustrated in FIG. 5, the fifth embodiment is constructed by modifying the fourth embodiment such that the projecting portion 46 formed at the lower inner peripheral part of the carbon monoxide reducer 10 is positioned adjacently to the preheat-evaporator 6 with the partition cylinder 30 therebetween, so that the heat transmission buffering section 11 is not formed between them. More concretely, the vertical wall 47*a* of the separating wall 47 extends downward from the upper wall of the cylindrical body 3 to a position that is about a half of the entire height (entire length) of the carbon monoxide reducer 10 and then extends horizontally inward so as to be joined to the partition cylinder 30 (the portion that extends horizontally (hereinafter referred to as "horizontally extending portion") corresponds to the extension portion (of the vertical wall 47*a*) stated in the claims). Reference numeral 50 designates the joint where the horizontally extending portion of the vertical wall 47*a* joins the partition cylinder 30. In this embodiment, since the upstream portion of the carbon monoxide reducer 10 exchanges heat with the preheat-evaporator 6 through only the partition cylinder 30, not only excessive heating at the upstream portion can be prevented but also the heat recovery efficiency of the water in the preheat-evaporator 6 can be increased. In addition, if the carbon monoxide reducer 10 is excessively heated to 300° C. or more in cases where a copper and zinc-based catalyst is used as the shifting catalyst of the carbon monoxide reducer 10, thermal degradation occurs in the catalyst, which adversely affects the performance of the catalyst. Such excessive heating can be prevented to maintain the durability of the shifting catalyst, by carrying out the heat exchange between the upstream portion corresponding to a high temperature portion of the carbon monoxide reducer 10 and the preheat-evaporator 6 with one partition wall (partition cylinder 30) interposed therebetween. Additionally, in the downstream portion of the carbon monoxide reducer 10, the amount of exchanged heat is restricted by the heat transmission buffering section 11, thereby preventing excessive cooling to a specified temperature or lower while reducing variations in the temperature distribution in the thickness direction.

Sixth Embodiment

Figure 8:
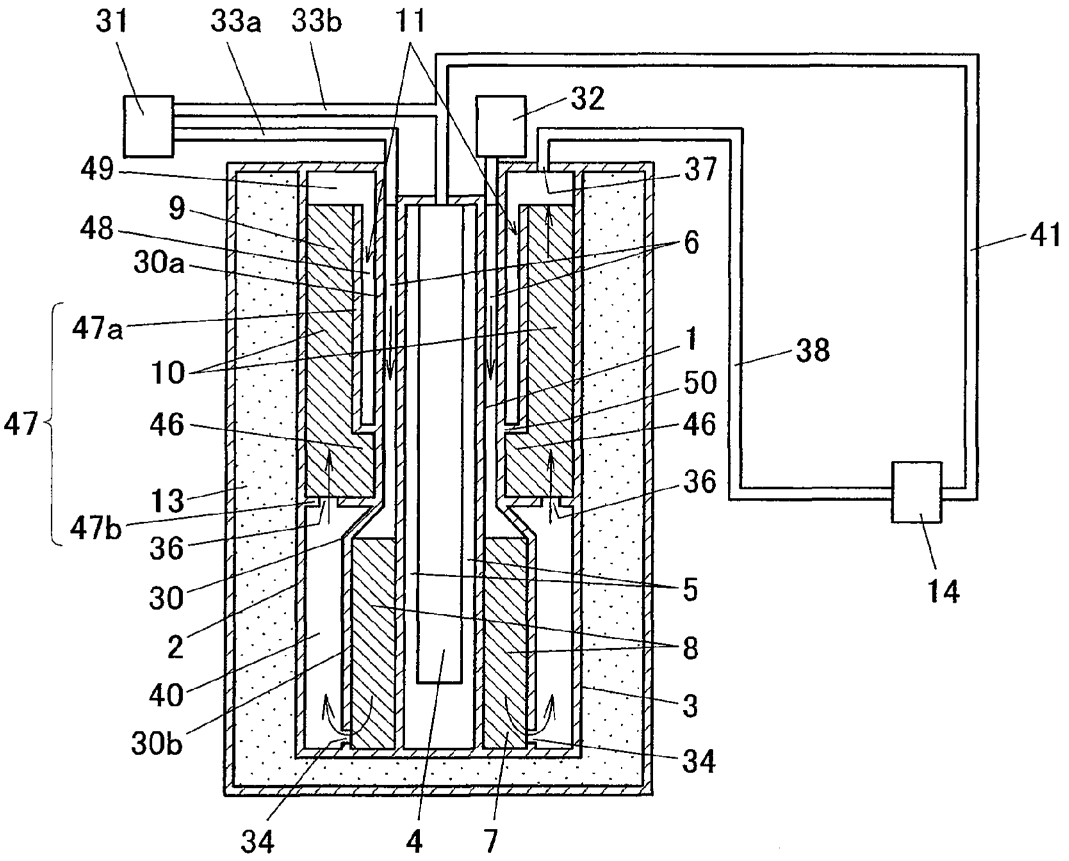
FIG. 8 is a sectional view that schematically shows a configuration of a hydrogen generator and a fuel cell system according to a sixth embodiment of the invention.

FIG. 8 is a sectional view that schematically shows a configuration of a hydrogen generator and a fuel cell system according to a sixth embodiment of the invention. As illustrated in FIG. 8, the sixth embodiment is the best mode obtained by modifying the fifth embodiment (FIG. 5). Concretely, the vertical wall 47*a* of the separating wall 47 is made of metal (e.g., stainless steel). The vertical wall 47*a* of the separating wall 47 has the shape of a flanged cylinder and its upper end is a specified distance apart from the upper wall of the cylindrical body 3. The vertical wall 47*a* downwardly extends from its upper end by approximately three fourth of the distance between the upper end position and the horizontal wall 47*b* of the separating wall 47 and then extends horizontally inward to be joined to the partition cylinder 30 (this horizontally extending portion corresponds to the extension portion (of the vertical wall 47*a*) stated in the claims). The space defined by the cylindrical body 3, the vertical wall 47*a* of the separating wall 47, the partition cylinder 30 and the horizontal wall 47*b* of the separating wall 47 and the carbon monoxide removing catalyst 9 filled in this space constitute the carbon monoxide reducer 10. The upper end of the carbon monoxide removing catalyst 9 conforms to the upper end of the separating wall 47. Therefore, the projection portion 46 of the lower inner peripheral portion of the carbon monoxide reducer 10 is adjacent to the preheat-evaporator 6 with the partition cylinder 30 therebetween, and the heat transmission buffering section 11 is not positioned between them. A reformed gas passage 49 for the reformed gas flowing out of the carbon monoxide reducer 10 is formed between the carbon monoxide reducer 10 and the upper wall of the cylindrical body 3, and the heat transmission buffering space 48 is communicated with this reformed gas passage 49. The reformed gas passage 49 is in communication with the outlet 37 provided in the upper wall of the cylindrical body 3. The upper end of the vertical wall 47*b* of the separating wall 47 that defines the carbon monoxide reducer 10 is neither connected to nor in contact with the metallic structure (the cylindrical body 3, the outer cylinder 2, and others) of the hydrogen generator which structure extends around the vertical wall 47*a*. The joint 50 between the horizontally extending portion of the vertical wall 47*a* of the separating wall 47 and the partition cylinder 30 is located at a position that is apart from the upstream end of the carbon monoxide removing catalyst 9 in the upstream portion of the carbon monoxide reducer 10 by one fourth of the length of the carbon monoxide removing catalyst 9. The position of the joint 50 is not necessarily limited to this but may be located at any position between the upstream end of the carbon monoxide removing catalyst 9 in the upstream portion of the carbon monoxide reducer 10 and the position that is apart from the upstream end by one fourth of the length of the carbon monoxide removing catalyst 9.

In such a configuration, the projecting portion 46 of the lower inner peripheral portion of the carbon monoxide reducer 10 is located adjacently to the preheat-evaporator 6 with one partition wall (the separating wall 47) therebetween like the fifth embodiment, so that the reaction heat generated in the upstream portion of the carbon monoxide reducer 10 can be thermally exchanged with the preheat-evaporator 6 without intervention of the heat transmission buffering section 11 and therefore an excessive temperature rise in the carbon monoxide removing catalyst 9 can be prevented. On the other hand, in the downstream side of the carbon monoxide reducer 10, the vertical wall 47*a* of the separating wall 47 enclosing the carbon monoxide removing catalyst 9 is neither connected to nor in contact with the metallic structure surrounding it, such as the preheat-evaporator 6, so that the heat dissipation from the carbon monoxide removing catalyst 9 owing to the heat conduction through the vertical wall 47*a* can be suppressed. As a result, the temperature distribution in the thickness direction (i.e., the temperature difference between the inner peripheral portion and the outer peripheral portion) in the downstream portion of the carbon monoxide removing catalyst 9 can be reduced.

Incidentally, about 80% or more of the shift reaction and the selective oxidation reaction which take place in the upstream portion of the carbon monoxide reducer 10 occur within the area between the upstream end of the carbon monoxide removing catalyst 9 and the point apart from the upstream end by one fourth of the length of the carbon monoxide removing catalyst 9. In this embodiment, since this area is adjacent to the preheat-evaporator 6 with one partition wall (separating wall 47) interposed therebetween, the amount of exchanged heat is large in the area where a large amount of reaction heat is generated and small in the area where a small amount of reaction heat is generated. As a result, the heat transmission buffering section 11 can effectively exert its heat exchange suppression function.

It should be noted that, in the fifth embodiment, the joint 50 between the horizontally extending portion of the vertical wall 47*a* of the separating wall 47 and the partition cylinder 39 may be arranged as described in the sixth embodiment (including the following note).

<Note>

Regarding the position of the joint 50 between the horizontally extending portion of the vertical wall 47*a* of the separating wall 47 and the partition cylinder 30, the following points should be noted.

In the configuration shown in FIG. 8, the optimal position for the joint 50 between the horizontally extending portion of the vertical wall 47*a* of the separating wall 47 and the partition cylinder 39 is determined based on the specifically assumed carbon monoxide removing catalyst 9. However, it is desirable that the joint 50 be located at a position that is between the upstream end and downstream end of the carbon monoxide reducer 10 in the flowing direction of the gas in the carbon monoxide reducer 10 and set according to the filling quantity of the carbon monoxide removing catalyst 9. This is because, generally the filling quantity of the carbon monoxide removing catalyst 9 is determined based on the amount of reformed gas generated in the hydrogen generator or the carbon monoxide removal characteristics (such as an initial characteristic and lifetime characteristic) of the carbon monoxide removing catalyst 9. More specifically, the ratio of the reaction (such as shift reaction in the case of the shifting catalyst and oxidation reaction in the case of the selective oxidation catalyst) of a catalyst that fills the carbon monoxide reducer 10 with respect to the filling length of the catalyst is substantially uniquely determined by the filling catalyst. For instance, where the filling quantity of the shifting catalyst is small, the carbon monoxide concentration at the outlet is high, compared to the case where the filling quantity of the shifting catalyst is large. However, when reformed gases are sampled at a certain filling length from carbon monoxide reducers having catalysts of the same kind, the carbon monoxide concentrations of the reformed gases are substantially the same, and therefore the same amount of heat is generated by the shift reaction or selective oxidation reaction at a certain filling length where catalysts of the same kind are used. On the other hand, in cases where different kinds of catalysts are used and their reactivities are different, their reaction rates are different with respect to the filling lengths of the catalysts. Therefore, it is desirable to set the joint 50 between the horizontally extending portion of the vertical wall 47*a* of the separating wall 47 and the partition cylinder 30 at a position that is determined based on the filling quantity of the carbon monoxide removing catalyst 9, the position of the joint 50 determining the area in which the heat exchange between the carbon monoxide reducer 10 and the preheat-evaporator 6 takes place with one partition wall (partition cylinder 30) interposed therebetween. Since the length of the space between the upstream end and downstream end of the carbon monoxide reducer 10 is different according to the filling quantity of the carbon monoxide removing catalyst 9, the positional relation of the joint 50 relatively varies with respect to the length of the space between the upstream end and downstream end.

Seventh Embodiment

Figure 9:
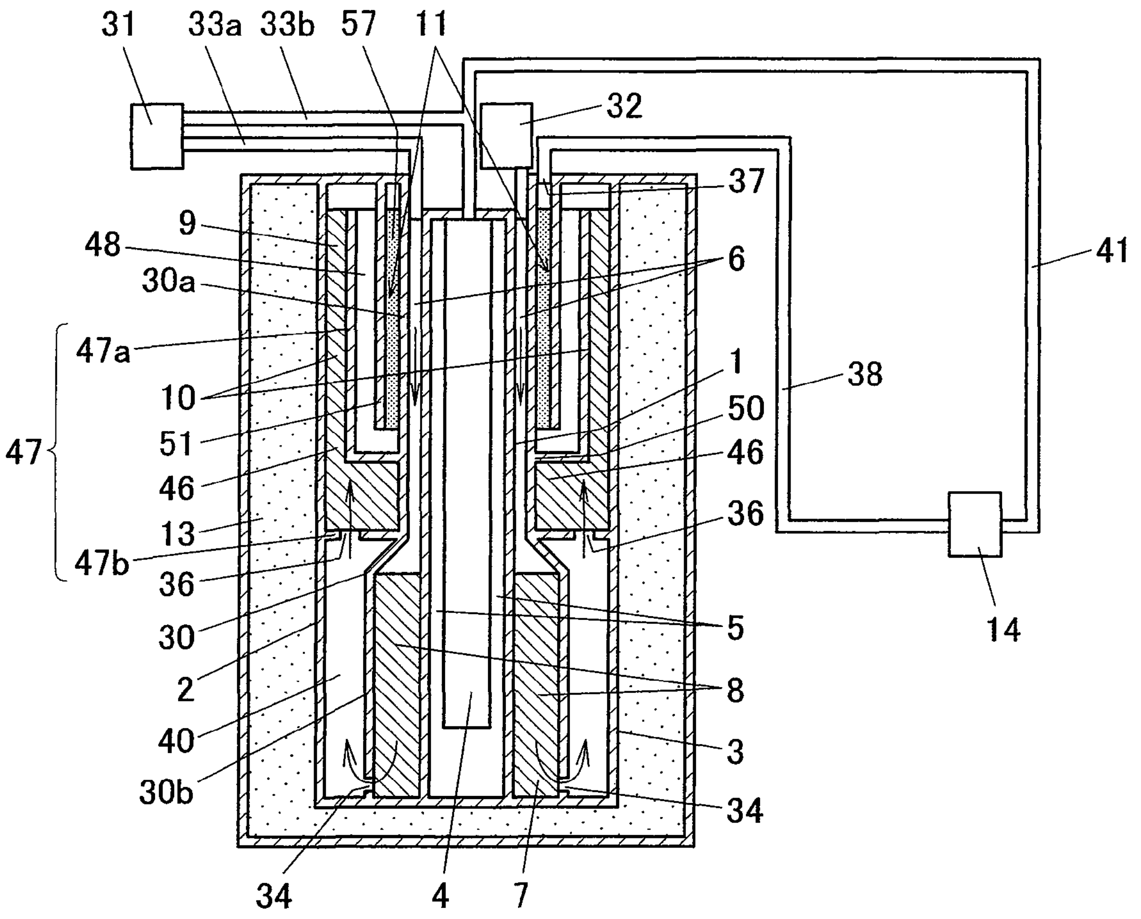
FIG. 9 is a sectional view that schematically shows a configuration of a hydrogen generator and a fuel cell system according to a seventh embodiment of the invention.

FIG. 9 is a sectional view that schematically shows a configuration of a hydrogen generator and a fuel cell system according to a seventh embodiment of the invention. As illustrated in FIG. 9, the seventh embodiment is constructed by modifying the configuration of the sixth embodiment (including "NOTE") such that the heat transmission buffering space 48 is provided with a cylindrical passage partition wall (hereinafter referred to as "heat transmission buffering section partition wall") 51 that extends downwardly from the upper wall of the cylindrical body 3. The heat transmission buffering section partition wall 51 is formed such that its lower end is spaced apart from the horizontally extending portion of the vertical wall 47*a* of the separating wall 47. Formed on the upper wall of the cylindrical body 3 is the outlet 37 for the reformed gas that is positioned between the upper end of the partition cylinder 30 and the upper end of the heat transmission buffering section partition wall 51. Thereby, the heat transmission buffering space 48 is provided with a reformed gas passage in which the reformed gas coming out of the carbon monoxide removing catalyst 9 flows, on the inner surface of the vertical wall 47*a* of the separating wall 47, in a direction opposite to the flow in the carbon monoxide removing catalyst 9 and then turns around to flow along the preheat-evaporator 10 in the same direction as the flow in the carbon monoxide removing catalyst 9. And, a portion of the passage within the heat transmission buffering space 48 is filled with a high heat transmission member 57, which portion is adjacent to the preheat-evaporator 10. This high heat transmission member 57 is made of particles (having particle sizes in the range of e.g., (ϕ1.0 mm to (ϕ3.0 mm) containing, as a chief component, alumina or metal.

According to this configuration, the reformed gas coming out of the carbon monoxide reducer 10 flows along the vertical wall 47*a* of the separating wall 47 and then flows in a position adjacent the preheat-evaporator 6. After the heat of the reformed gas is exchanged with and recovered by the preheat-evaporator 6, the reformed gas is discharged outwardly from the hydrogen generator as low-temperature reformed gas. Accordingly, the amount of heat taken out of the hydrogen generator by the reformed gas can be minimized, so that a hydrogen generator of high heat utilization coefficient can be realized.

In addition, since the portion of the passage of the heat transmission buffering space 48, which portion is adjacent to the preheat-evaporator 10, is filled with the high heat transmission member 57, the transmission of heat from the reformed gas can be promoted, resulting in an improvement in the heat exchange performance.

Instead of the configuration in which the portion of the passage of the heat transmission buffering space 48, which portion is adjacent to the preheat-evaporator 10, is filled with the high heat transmission member 57, an alternative configuration may be employed in which the portion of the passage of the heat transmission buffering space 48, which portion is adjacent to the preheat-evaporator 10, is narrowed thereby increasing the flow speed of the reformed gas to obtain improved heat exchange performance.

Eighth Embodiment

Figure 10:
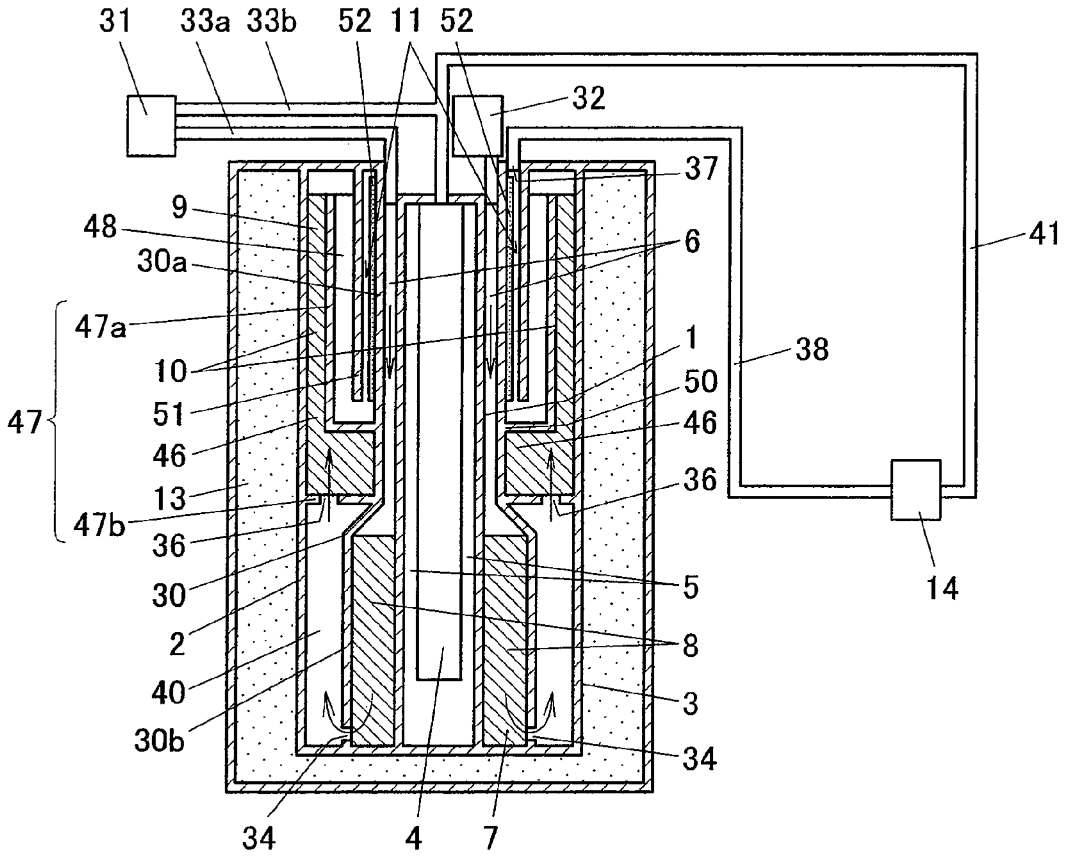
FIG. 10 is a sectional view that schematically shows a configuration of a hydrogen generator and a fuel cell system according to an eighth embodiment of the invention.

FIG. 10 is a sectional view that schematically shows a configuration of a hydrogen generator and a fuel cell system according to an eighth embodiment of the invention. As illustrated in FIG. 10, the eighth embodiment is constructed by modifying the configuration of the seventh embodiment such that the portion of the passage of the heat transmission buffering space 48, which portion is adjacent to the preheat-evaporator 6, is provided with a heat transmission fin 52 made of metal in place of the high heat transmission member 57. The heat transmission fin 52 is disposed on the surface of the portion of the partition cylinder 30 which portion is located between the passage of the heat transmission buffering space 48 and the preheat-evaporator 6. According to this configuration, the heat transmission area of the surface of the partition cylinder 30 that defines the preheat-evaporator 6 can be increased and, in consequence, improved heat exchange performance can be achieved without significantly increasing passage pressure losses.

Ninth Embodiment

Figure 11:
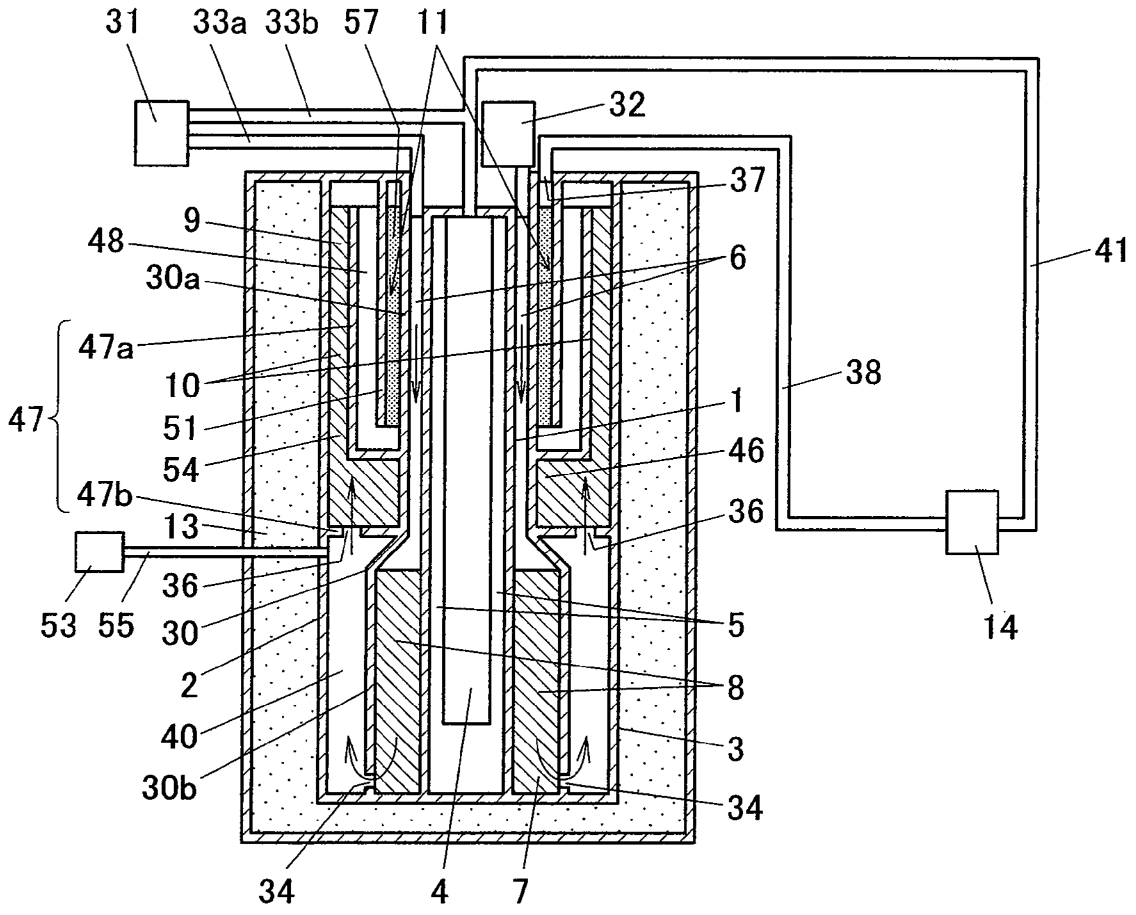
FIG. 11 is a sectional view that schematically shows a configuration of a hydrogen generator and a fuel cell system according to a ninth embodiment of the invention.

FIG. 11 is a sectional view that schematically shows a configuration of a hydrogen generator and a fuel cell system according to a ninth embodiment of the invention. As illustrated in FIG. 11, the ninth embodiment is constructed by modifying the configuration of the seventh embodiment (FIG. 9) such that the carbon monoxide reducer 10 is provided with an air feeding section 53 for supplying air and a carbon monoxide removing catalyst 54 in the carbon monoxide reducer 10 is composed of a selective oxidation catalyst. Specifically, the reformed gas passage 40 is provided with an air feeding path 55 that is open at its downstream end and is formed so as to extend to the outside, passing through the cylindrical body 3, the heat insulating layer 13 and the outside wall. Connected to the upstream end of the air feeding path 55 is the air feeding section 53.

According to this configuration, the air feeding section 53 feeds air to the reformed gas that flows into the selective oxidation catalyst 54 and a mixture gas of the reformed gas and air is accordingly fed to the selective oxidation catalyst 54. At the selective oxidation catalyst 54, an oxidation reaction occurs such that CO contained in the mixture gas selectively reacts with oxygen contained in air, thereby reducing CO. At that time, heat generation due to the oxidation reaction occurs in the upstream portion of the selective oxidation catalyst 54. However, an excessive temperature rise in the selective oxidation catalyst 54 can be prevented, because the upstream portion of the selective oxidation catalyst 54 is adjacent to the preheat-evaporator 6 with one partition wall (partition cylinder 30) therebetween and can therefore be sufficiently heat-exchanged with the preheat-evaporator 6. In addition, since the heat transmission buffering section 11 is formed between the downstream portion of the selective oxidation catalyst 54 and the preheat-evaporator 6 and, moreover, the upper end of the vertical wall 47*a* of the separating wall 47 surrounding the selective oxidation catalyst is neither connected to nor in contact with the preheat-evaporator 6, heat in the downstream portion of the selective oxidation catalyst 54 does not dissipate, so that the temperature distribution in the thickness direction of the selective oxidation catalyst 54 can be suppressed. Furthermore, the reformed gas passes through the space between the heat transmission buffering section partition wall 51 of the heat transmission buffering section 11 and the preheat-evaporator 6, thereby recovering the heat of the reformed gas. As a result, the selective oxidation catalyst 54 can be entirely kept in a proper temperature condition from its upstream to its downstream and throughout its thickness, so that the catalyst can exert its performance to a maximum extent. In addition, a hydrogen generator having high heat utilization coefficient can be realized.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function maybe varied substantially without departing from the spirit of the invention.

INDUSTRIAL APPLICABILITY

The hydrogen generator according to the invention and the fuel cell system that employs this hydrogen generator can reduce the temperature distribution in the thickness direction of the cylindrical carbon monoxide reducer and therefore useful as a hydrogen generator, a fuel cell system using it and others that are capable of stably reducing the amount of carbon monoxide contained in the reformed gas.

The invention claimed is:

1. A hydrogen generator comprising:

a combustion gas passage configured to flow combustion gas which has been generated in a combustor;

a preheat-evaporator which is supplied with a material gas and water and configured to evaporate the water and heat the material gas by heat transmitted from the combustion gas passage and a carbon monoxide reducer through a partition wall;

a reformer which has a reforming catalyst and is configured to generate a hydrogen-containing reformed gas through a steam reforming reaction between the material gas and steam fed from the preheat-evaporator, by using the reforming catalyst and the heat transmitted from the combustion gas passage through the partition wall;

the carbon monoxide reducer which has a carbon monoxide removing catalyst and is configured to remove carbon monoxide from the reformed gas fed from the reformer by an action of the carbon monoxide removing catalyst; and a cylindrical body closed at both ends thereof, having an internal space which is divided by the partition wall to form the combustion gas passage, the preheat-evaporator, the reformer and the carbon monoxide reducer within the cylindrical body;

wherein a heat transmission buffering section is provided between the preheat-evaporator and the carbon monoxide reducer, the heat transmission buffering section being formed by a space between the partition wall that defines the preheat-evaporator and the partition wall that defines the carbon monoxide reducer, the partition walls being opposed to each other; and at least one end of the heat transmission buffering section is closed when viewed from a flow direction of the reformed gas.

2. The hydrogen generator according to claim 1, wherein the space (hereinafter referred to as "heat transmission buffering space") between the partition walls opposed to each other in the heat transmission buffering section is closed except an area communicated with a passage for the reformed gas flowing from the reformer to the carbon monoxide reducer or a passage for the reformed gas flowing out of the carbon monoxide reducer.

3. The hydrogen generator according to claim 2, wherein the heat transmission buffering space is in communication with a passage for the reformed gas flowing out of the carbon monoxide reducer, and wherein a portion of the carbon monoxide reducer defining partition wall which portion faces the preheat-evaporator defining partition wall is made of metal and an extension portion of the portion is joined to the preheat-evaporator defining partition wall at the upstream side of the carbon monoxide reducer in the flow of the reformed gas.

4. The hydrogen generator according to claim 3, wherein a joint portion between the extension portion and the preheat-evaporator defining partition wall is located at a position between an upstream end and a downstream end of the carbon monoxide reducer in a flowing direction of a gas in the carbon monoxide reducer, the position being set based on filling quantity of the carbon monoxide removing catalyst.

5. The hydrogen generator according to claim 3, wherein a joint portion between the extension portion and the preheat-evaporator defining partition wall is located at a position between an upstream end of the carbon monoxide reducer and a position apart from the upstream end by about one fourth of a length of the carbon monoxide reducer in a flowing direction of a gas in the carbon monoxide reducer.

6. The hydrogen generator according to claim 4, wherein, a heat transmission buffering section partition wall is formed in the heat transmission buffering space such that the reformed gas flowing out of the carbon monoxide reducer flows in a direction opposite to a flowing direction of the reformed gas in the carbon monoxide reducer along the carbon monoxide reducer defining partition wall and then flow in the same direction as the flowing direction of the reformed gas in the carbon monoxide reducer along the preheat-evaporator defining partition wall.

7. The hydrogen generator according to claim 4, wherein the reformed gas flowing in the heat transmission buffering space changes its flowing direction from the opposite direction to the same direction relative to the flowing direction of the reformed gas in the carbon monoxide reducer at a position which is located between the upstream end and downstream end of the carbon monoxide reducer in the flowing direction of the gas in the carbon monoxide reducer, the position being set based on the filling quantity of the carbon monoxide removing catalyst.

8. The hydrogen generator according to claim 6, wherein the reformed gas flowing in the heat transmission buffering space changes its flowing direction from the opposite direction to the same direction relative to the flowing direction of the reformed gas in the carbon monoxide reducer at a position which is located between the upstream end of the carbon monoxide reducer in the flowing direction of the gas in the carbon monoxide reducer and a position that is apart from the upstream end by substantially one fourth of the length of the carbon monoxide reducer.

9. The hydrogen generator according to claim 6, wherein the passage in the heat transmission buffering space, in which the reformed gas flows along the preheat-evaporator defining partition wall, is provided with a heat transmission member.

10. The hydrogen generator according to claim 9, wherein the heat transmission member is composed of particles containing alumina or metal as a chief component.

11. The hydrogen generator according to claim 6, wherein the preheat-evaporator defining partition wall along which the reformed gas flows in the heat transmission buffering space, is provided with a fin-shaped projection.

12. The hydrogen generator according to claim 1, wherein the space between the partition walls opposed to each other in the heat transmission buffering section is filled with a heat transmission member.

13. The hydrogen generator according to claim 1, wherein the heat transmission buffering section is formed such that an amount of heat transmitted from the carbon monoxide reducer to the preheat-evaporator is larger at an upstream side of the carbon monoxide reducer than at a downstream side in a flow of the reformed gas.

14. The hydrogen generator according to claim 13, wherein the space between the partition walls opposed to each other in the heat transmission buffering section is narrower at the upstream side of the carbon monoxide reducer than at the downstream side in the flow of the reformed gas.

15. The hydrogen generator according to claim 1, wherein a heat insulating layer is disposed so as to enclose the cylindrical body.

16. The hydrogen generator according to claim 1, wherein an air feeding path is formed for feeding air to a passage for the reformed gas that flows into the carbon monoxide reducer, and wherein the carbon monoxide removing catalyst is a selective oxidation catalyst.

17. A fuel cell system comprising the hydrogen generator described in claim 1 and a fuel cell for generating electric power by use of reformed gas fed from the hydrogen generator and oxygen-containing oxidizing gas.

* * * * *